United States Patent [19]

Allen

[11] 4,060,842

[45] Nov. 29, 1977

[54] COMBINED MUTUAL DRAINAGE REACTOR AND GROUNDING RELAY

[76] Inventor: Gordon Y. R. Allen, 4 Ireland Court, Islington, Ontario, Canada

[21] Appl. No.: 661,005

[22] Filed: Feb. 24, 1976

[51] Int. Cl.² .............................................. H02H 3/22
[52] U.S. Cl. ........................................ 361/56; 361/91; 361/119; 361/120
[58] Field of Search .................... 317/16, 61.5, 62, 76, 317/61, 17

[56] References Cited

U.S. PATENT DOCUMENTS

| | | | |
|---|---|---|---|
| 1,382,795 | 6/1921 | McNeill | 317/76 X |
| 1,785,972 | 12/1930 | Osborne | 317/76 |
| 1,971,146 | 8/1934 | Rovere et al. | 317/76 X |
| 3,492,532 | 1/1970 | Fayling | 317/16 |
| 3,858,089 | 12/1974 | Poindexter | 317/61 X |
| 3,959,694 | 5/1976 | Walsh | 317/62 X |

Primary Examiner—J. D. Miller
Assistant Examiner—Patrick R. Salce
Attorney, Agent, or Firm—Edwin E. Greigg

[57] ABSTRACT

A combination mutual drainage reactor and grounding relay for protection of a two-wire communication circuit comprising a pair of inductively coupled coils each having one end grounded and the other end connected to a corresponding communication line through one of a pair of magnetically operated, normally open S.P.S.T. gas-filled reed switches which are disposed in the common magnetic circuit of the two coils and which have predetermined voltage breakdown characteristics between their open contacts.

A voltage from one line to ground in excess of the breakdown voltage characteristic of the connected reed switch causes current flow across the open switch contacts and through one coil to ground. The voltage thus impressed across this coil produces an equal voltage across the other magnetically coupled coil, which, in turn, causes the other reed switch to conduct, thereby preventing abnormal line-to-line voltage and maintaining balanced line-to-ground voltages. When the overvoltage ceases, the reed switches become nonconductive and isolate the drainage reactor from the communication lines.

If the line overvoltage and the proportional currents flowing between the open contacts of the switches exceeds a predetermined value and/or persists for predetermined time, the magnetic force on the reed switches will close these switches while such current persists to protect the reed switches from open contact operation in excess of their rated capacity for such operation and to minimize erosion of the switch contacts while conducting current across open contacts.

8 Claims, 2 Drawing Figures

4,060,842

COMBINED MUTUAL DRAINAGE REACTOR AND GROUNDING RELAY

BACKGROUND OF THE INVENTION

This invention relates to protective devices for communication lines and equipment and in particular to drainage reactor systems for minimizing the effect of overvoltage and current conditions caused by lightning surges or by an electric power system, either directly, such as a metallic cross of lines or a ground potential rise, or indirectly by magnetic or electric induction.

The use of mutual drainage reactors which operate only during overvoltage conditions to provide a path to ground and to induce an equal voltage in the accompanying line for maintaining line-to-line and line-to-ground balance is well known. For example, U.S. Pat. No. 3,496,418, granted Feb. 17, 1970 to Gordon Y. R. Allen, discloses a mutual drainage reactor apparatus which is connected across the two lines of a communication circuit through standard carbon block protectors.

However, these carbon block protectors have very limited current-carrying capacity and will short to ground if large or prolonged currents are passed through them. In normal telephone work it is common practice to use additional devices to protect carbon blocks or gas-filled protectors from such overcurrents. For example, the operating coil of a grounding relay is often connected in series with a protector connected between line and ground with its contacts in parallel with the protector so that when the current through the protector exceeds its rating, the relay contacts will close and bypass the current around the protector until the abnormal circuit conditions subside.

SUMMARY OF THE INVENTION

It is an object of this invention to disclose a mutual drainage reactor connected across the lines of a communication circuit through protectors which only allow current flow when the line voltage is abnormally high, in which elements of the drainage reactor and the protectors perform the additional function of a grounding relay by preventing failure of the protectors caused by excessive current.

The drainage reactor includes two coils having an equal number of turns and inductively coupled by a magnetic core with one terminal of each coil connected to ground. The other terminal of each coil is connected through a protector to one of the two communication lines.

Each protector is a gas-filled reed switch similar to that disclosed in U.S. Pat. No. 3,858,089, granted Dec. 31, 1974 to Carleton H. Poindexter, in which the two normally open contacts serve as the electrodes of a gas-filled protector device. These switches are disposed in an air gap of the magnetic core common to the two coils of the drainage reactor.

When the voltage of one of these lines becomes abnormally high, ionization of the gas between the open contacts of the reed switch connected to that line will occur and current will flow through this switch and the connecting coil to ground.

This, in turn, will induce an approximately equal voltage in the other coil of the drainage reactor causing the gas-filled reed switch connected to this other coil to conduct, thereby raising the voltage on the other communication line to approximately that of the first line. Thus equipment connected between the two communication lines is not exposed to any abnormal line-to-line voltage and the voltage-to-ground of the two lines will be balanced.

Should the overvoltage exceed a predetermined value and/or persist for a predetermined time corresponding to a current/time value less than the rating of the reed switches when operated with open contacts as gas-filled protector tubes, the current passing through the drainage reactor coils will generate a magnetic field across the air gap of sufficient force to cause the contacts of the two reed switches to close and remain closed during the duration of such excessive voltage conditions.

A magnetic shunt across the air gap can be used to prevent the magnetic closing of the reed switches for short time transient overvoltage conditions. Also the circuit position of the reactor coils and the reed switches can be interchanged, thereby permitting the use of a single, two-pole switch instead of two single-pole switches.

The invention will be better understood as well as further objects and advantages thereof will become more apparent from the ensuing detailed specification of a preferred embodiment taken in conjunction with the drawing.

DETAILED DESCRIPTION OF A PREFERRED EMBODIMENT

Figure 1:
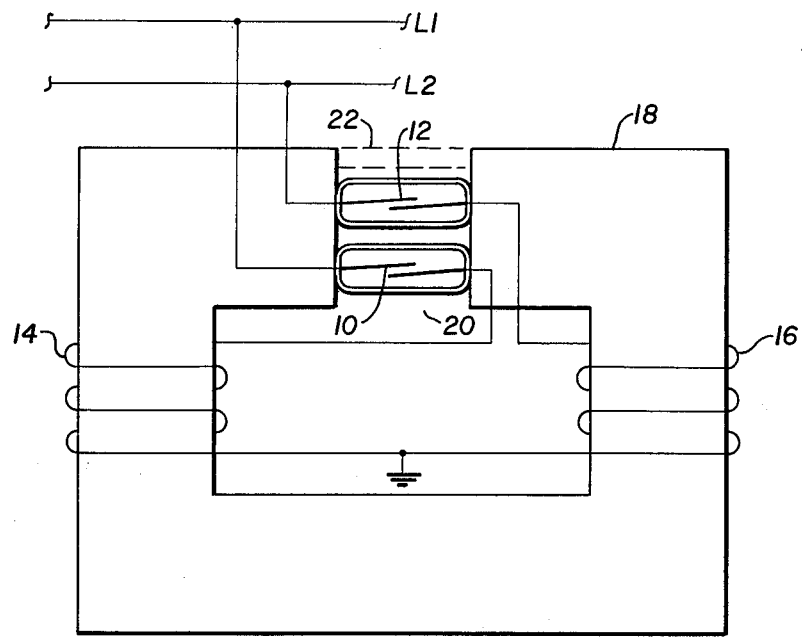
FIG. 1 shows a schematic representation of one embodiment of the invention having a single path magnetic circuit.

Referring now to FIG. 1, the lines L1, L2 of a two-wire communication circuit are connected to ground through respective, magnetically-operated, single-pole, normally open, gas-filled reed switches 10, 12 and coils 14, 16. The two coils 14, 16 are magnetically coupled by a magnetic core 18 containing a uniform air gap 20. The two coils 14, 16 are connected so that an alternating voltage applied to the ungrounded end of one of the coils 14, 16 will produce an approximate equal alternating voltage at the ungrounded end of the other of the two coils 14, 16. The reed switches 10, 12 are disposed within the air gap 20 so that a predetermined magnetic flux flowing through the core 18 and across the air gap 20 will close these switches 10, 12.

The line L1 is connected through the reed switch 10 and the coil 14 to ground; similarly, the line L2 is connected through the reed switch 12 and the coil 16 to ground.

When an overvoltage occurs on the line L1, the gas between the contacts of the reed switch 10 will be ionized, and a current will flow from the line L1 through the switch 10 and coil 14 to ground, with most of the overvoltage being applied across the coil 14. This, in turn, produces an approximately equal voltage across the other coil 16 which causes the gas between the contacts of the other reed switch 12 to ionize and conduct current from the other line L2 to ground, raising the potential of the line L2 to approximately that of the line L1. Thus, the equipment connected between the lines L1, L2 is not exposed to an excessive line-to-line voltage and the line voltage to ground of the lines L1, L2 will be balanced.

To minimize the erosive effect of current flowing between the open contacts of the reed switches 10, 12, these switches are disposed in the air gap 20 of the magnetic core 18 coupling the two coils 14, 16 so that the magnetic flux generated by current flowing through the coil 14 will close the contacts of both switches 10, 12 and maintain these switches 10, 12 closed until the overvoltage on the line (and the proportional current flowing through the coils 14, 16) has dropped to an acceptable, predetermined value, at which point these switches 10, 12 will open and disconnect the coils 14, 16 from the lines L1, L2.

Since one of the reed switches 10, 12 must operate as a gas-filled protector element before current can flow through one of the drainage coils 14, 16, these reed switches 10, 12 will not be magnetically closed during very short transient overvoltages. In such a case, these switches will interrupt the currents flowing between the lines L1, L2 and ground as soon as the transient overvoltage is removed.

The magnetic circuit of this apparatus can be designed so that the reed switches 10, 12 will not be magnetically closed for overvoltage conditions below a predetermined level and/or duration of time within the time/current rating of the reed switches. For example, the air gap 20 can be magnetically bypassed by a section of the magnetic core, such as the magnetic shunt 22 shown in dotted lines in FIG. 1. This shunt 22 will effectively prevent the flow of magnetic flux across the air gap 20 until it becomes magnetically saturated. Also, this shunt 22 can be used for structural support of the core 20.

Figure 2:
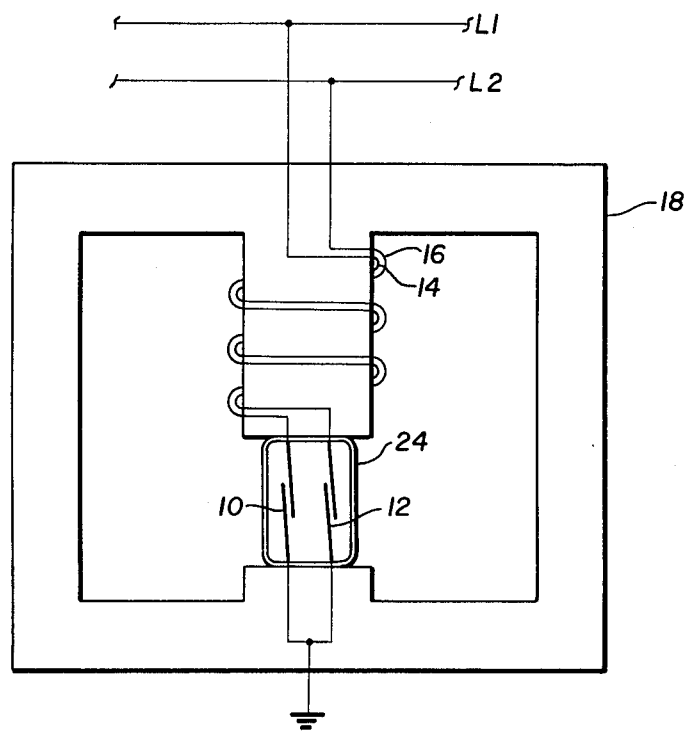
FIG. 2 shows a schematic representation of another embodiment of this invention having two magnetic paths, bifilar windings and a D.P.S.T. reed switch.

Alternatively, the coils 14, 16 can be wound bifilarly on a common leg of the core 18 to limit leakage flux and thus improve efficiency, as illustrated in FIG. 2.

Also, the magnetic core 18 is not limited to a single magnetic path as shown in FIG. 1. For example, the core 18 of FIG. 2 has three legs, with the air gap 20 disposed in the center leg, about which the coils 14, 16 are wound.

FIG. 2 also illustrates another alternative arrangement of this invention, wherein the circuit placement of the coils and switches is reversed, so that each coil 14, 16 is connected directly to its respective line L1, L2 and through the gas-filled reed switch to ground. Such an arrangement permits the use of a single enclosure 24 for these switches.

What is claimed is:
1. A combined mutual drainage reactor and grounding relay for overvoltage protection of a two-wire communication system, which comprises:
 a magnetic core, at least a portion of which includes a uniform air gap;
 a pair of coils inductively coupled by the magnetic core, each having the same number of turns; and
 a pair of magnetically-operated, normally open, single-pole, single-throw, gas-filled reed switches, each having approximately the same voltage breakdown characteristics between its open contacts, and each switch requiring approximately the same minimum magnetic field strength for closure, both switches being disposed in said air gap of said magnetic core,
 wherein each coil is connected in series with a corresponding one of said switches across one of the two communication lines to ground, so that a voltage applied across one of said coils will induce an approximately equal voltage across the other of said coils.

2. A combined mutual drainage reactor and grounding relay as described in claim 1, wherein said magnetic core and air gap comprise a single magnetic circuit.

3. A combined mutual drainage reactor and grounding relay as described in claim 1, wherein said magnetic core comprises at least three legs.

4. A combined mutual drainage reactor and grounding relay as described in claim 1, wherein said coils are bifilar wound coils.

5. A combined mutual drainage reactor and grounding relay as described in claim 1, which further comprises a magnetic shunt across said air gap.

6. A combined mutual drainage reactor and grounding relay as described in claim 1, wherein each of said switches is connected between one of said communication lines and one end of a corresponding one of said coils, with the opposite end of both coils being connected to ground.

7. A combined mutual drainage reactor and grounding relay as described in claim 1, wherein each of said switches is connected between ground and one end of a corresponding one of said coils, with the opposite end of each coil being connected to a corresponding communication line.

8. A combined mutual drainage reactor and grounding relay as described in claim 1, wherein said switches are contained within a single gas-filled enclosure.

* * * * *